US011001190B1

(12) United States Patent
Dahl

(10) Patent No.: US 11,001,190 B1
(45) Date of Patent: May 11, 2021

(54) EXPANDABLE NET

(71) Applicant: Michael Thomas Dahl, Mukilteo, WA (US)

(72) Inventor: Michael Thomas Dahl, Mukilteo, WA (US)

(*) Notice: Subject to any disclaimer, the term of this patent is extended or adjusted under 35 U.S.C. 154(b) by 0 days.

(21) Appl. No.: 17/028,272

(22) Filed: Sep. 22, 2020

(51) Int. Cl.
B60P 7/08 (2006.01)

(52) U.S. Cl.
CPC ............ B60P 7/0876 (2013.01); B60P 7/0838 (2013.01)

(58) Field of Classification Search
CPC ......... B60P 7/0876; B60P 7/0838; B60P 7/04; B60R 5/047; B60R 7/005
USPC .......................... 410/117, 118, 97, 100, 103
See application file for complete search history.

(56) References Cited

U.S. PATENT DOCUMENTS

| 4,842,458 A * | 6/1989 | Carpenter ............... B60P 7/083 410/103 |
| 6,109,846 A * | 8/2000 | Davis .................... B60P 7/0846 410/100 |
| 6,152,664 A * | 11/2000 | Dew ..................... B60P 7/0876 410/100 |
| 6,817,644 B2 | 11/2004 | Moore |
| 8,192,118 B2 | 6/2012 | Zahorec |
| 8,740,525 B2 * | 6/2014 | Coury ..................... B60P 7/06 410/118 |
| 8,757,947 B2 | 6/2014 | Knox |
| 8,870,504 B2 * | 10/2014 | Wienke ................ B60P 7/0823 410/118 |
| 10,518,693 B2 | 12/2019 | Moua |
| 10,576,869 B2 | 3/2020 | Villacres |
| 2018/0147082 A1 | 5/2018 | Maltais |
| 2018/0216266 A1 | 8/2018 | Corrina |
| 2020/0086800 A1 | 3/2020 | Boelter |

FOREIGN PATENT DOCUMENTS

CN 208908910 5/2019

* cited by examiner

Primary Examiner — Stephen T Gordon
(74) Attorney, Agent, or Firm — Timothy E. Siegel Patent Law, PLLC; Timothy E. Siegel

(57) ABSTRACT

An expandable net, including a plurality of spring reels. Each spring reel has a housing defining an interior and having a central anchor, in the interior, and further defining an opening; a spool rotatably mounted inside the housing, and having a side wall; a tension member wound about the spool and extending through the opening and having a distal end; and a spiral spring anchored at the anchor and having an outer end, attached to the side wall. Further, the distal end of each tension member is attached to the housing of another spring reel, thereby forming the expandable net.

14 Claims, 4 Drawing Sheets

EXPANDABLE NET

BACKGROUND OF THE INVENTION

Every year, people are injured and killed by items that are poorly stowed in the bed of a pickup truck and go flying out while the truck is being driven, striking another driver or a pedestrian. In the case of another driver who is struck or distracted by an object hurtling toward his windshield, this can lead to a fatality. If a tarp is used, the Bernoulli principal causes the tarp to flap annoyingly and to be pulled upwardly, possibly causing the tarp to work itself free from its restraints, and go flying off, thereby constituting a danger to other drivers.

Although nets made of elastic elements are available, these can be a challenge to both stretch to fit the needed area, and yet collapse to a small enough package to easily stow. Moreover, there is nothing engaging about these nets. Often, after purchase they remain, unused, in a little-noticed corner of the vehicle, out-of-sight and out-of-mind.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

An expandable net, including a plurality of spring reels. Each spring reel has a housing defining an interior and having a central anchor, in the interior, and further defining an opening; a spool rotatably mounted inside the housing, and having a side wall; a tension member wound about the spool and extending through the opening and having a distal end; and a spiral spring anchored at the anchor and having an outer end, attached to the side wall. Further, the distal end of each tension member is attached to the housing of another spring reel, thereby forming the expandable net.

A method of covering an open volume, partially enclosed by a rim, that utilizes an expandable net having a perimeter, and including a plurality of spring reels, each having a housing defining an interior and having a central anchor, in the interior, and further defining an opening; a spool rotatably mounted inside the housing, and having a side wall; a tension member wound about the spool and extending through the opening; a spiral spring anchored at the anchor and having an outer end, attached to the side wall. The distal end of each tension member is attached to the housing of another the spring reel, thereby forming the expandable net. In the method, the expandable net is expanded, and the perimeter is attached to the rim of the open volume.

A two line spring reel unit, including a housing defining a first opening and a second opening; a first anchor and a second anchor, inside and fixed to the housing; a first spiral spring having an inner end held by the first anchor and a second spiral spring having an interior end held by the second anchor; a first spool, fixed to rotate about a first pin, and a second spool set to rotate about a second pin and wherein the first spiral spring has an outer end attached to the first spool and the second spiral spring has an outer end attached to the second spool; and a first tension member, wrapped about the first spool and extending out of the first opening and a second tension member wrapped about the second spool and extending out of the second opening.

BRIEF DESCRIPTION OF DRAWINGS

Various embodiments of the invention are disclosed in the following detailed description and accompanying drawings.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
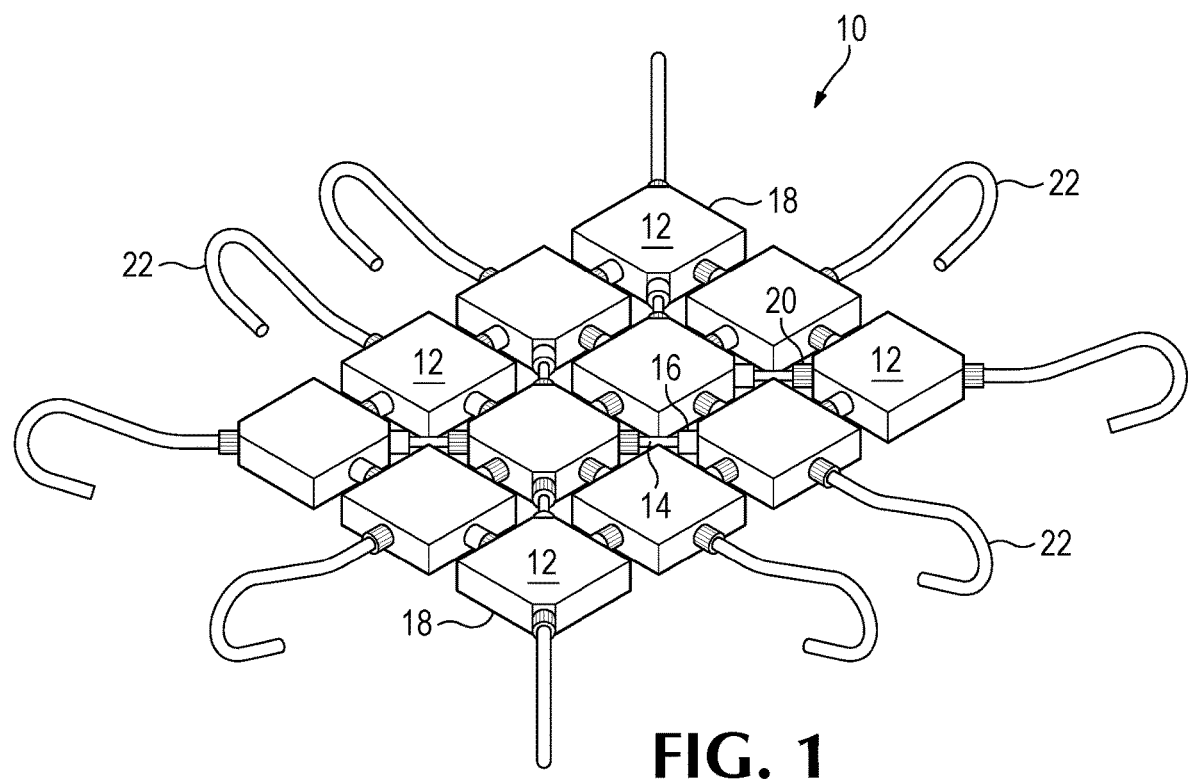
FIG. 1 is an isometric view of an expandable cargo net, according to the present invention, in a compressed state.

Referring to FIG. 1, in a preferred embodiment of an expandable net 10, a plurality of spring reel units 12 are joined together by retractable lines 14, each of which emanates from a spring reel unit 12, at an opening 16 from which the line 14 can be drawn out and into which the line 14 can be retracted. At least one line 14 of each spring reel unit 12, is anchored to the housing 18, of another spring reel unit 12, at an anchoring point 20, as shown. Further a set of hooks 22, set about the perimeter of expandable net 10, can serve to attach net 10 about the rim of an open volume, in order to cover that volume. In the embodiment shown, each unit 12, except one, hosts two lines 14, so that there are twenty-three lines 14 in all, connecting twelve units 12.

Figure 2:
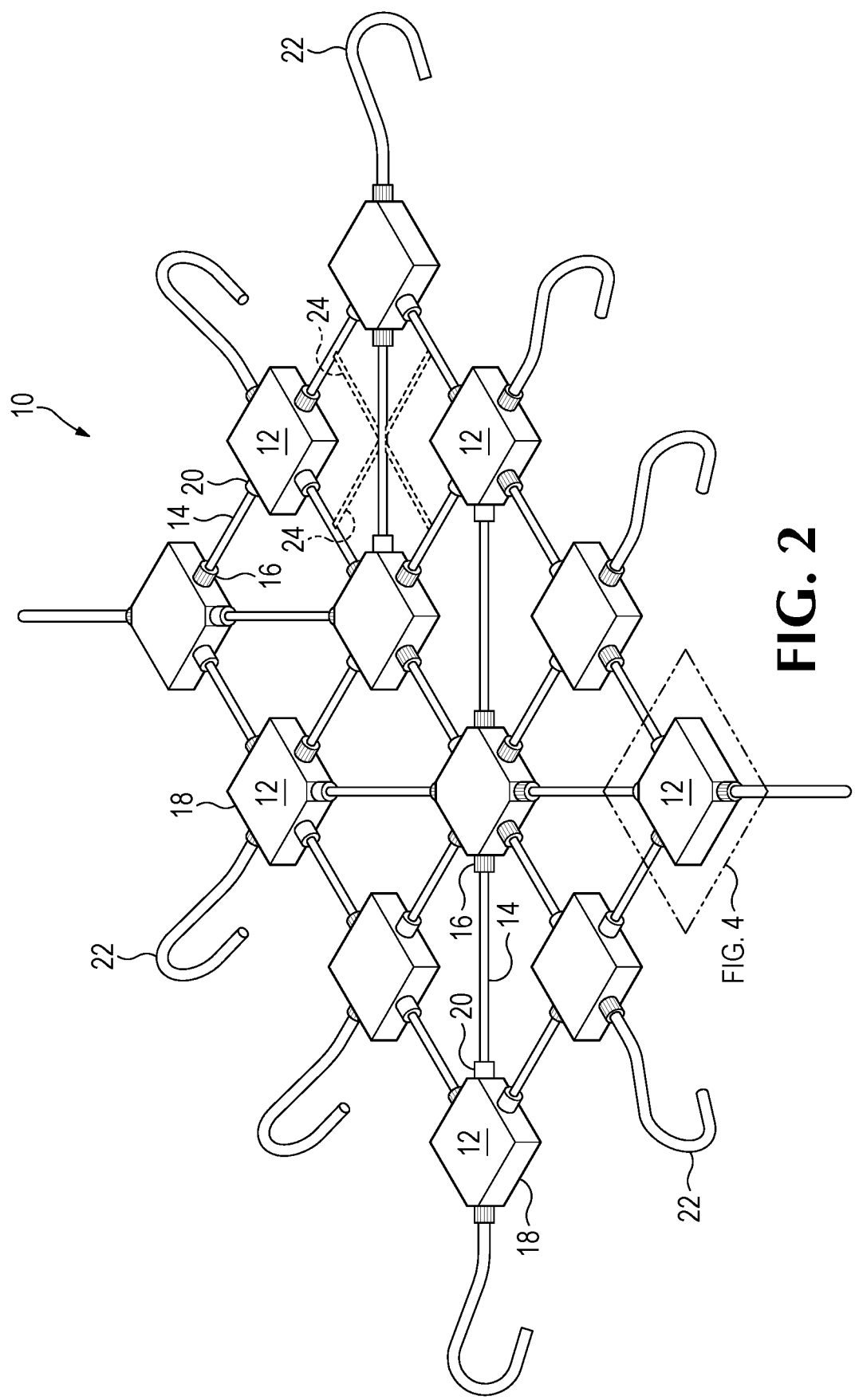
FIG. 2 is an isometric view of the cargo net of FIG. 1, in a partially expanded state, and showing an alternative embodiment in partial view, in dashed lines.
Figure 3:
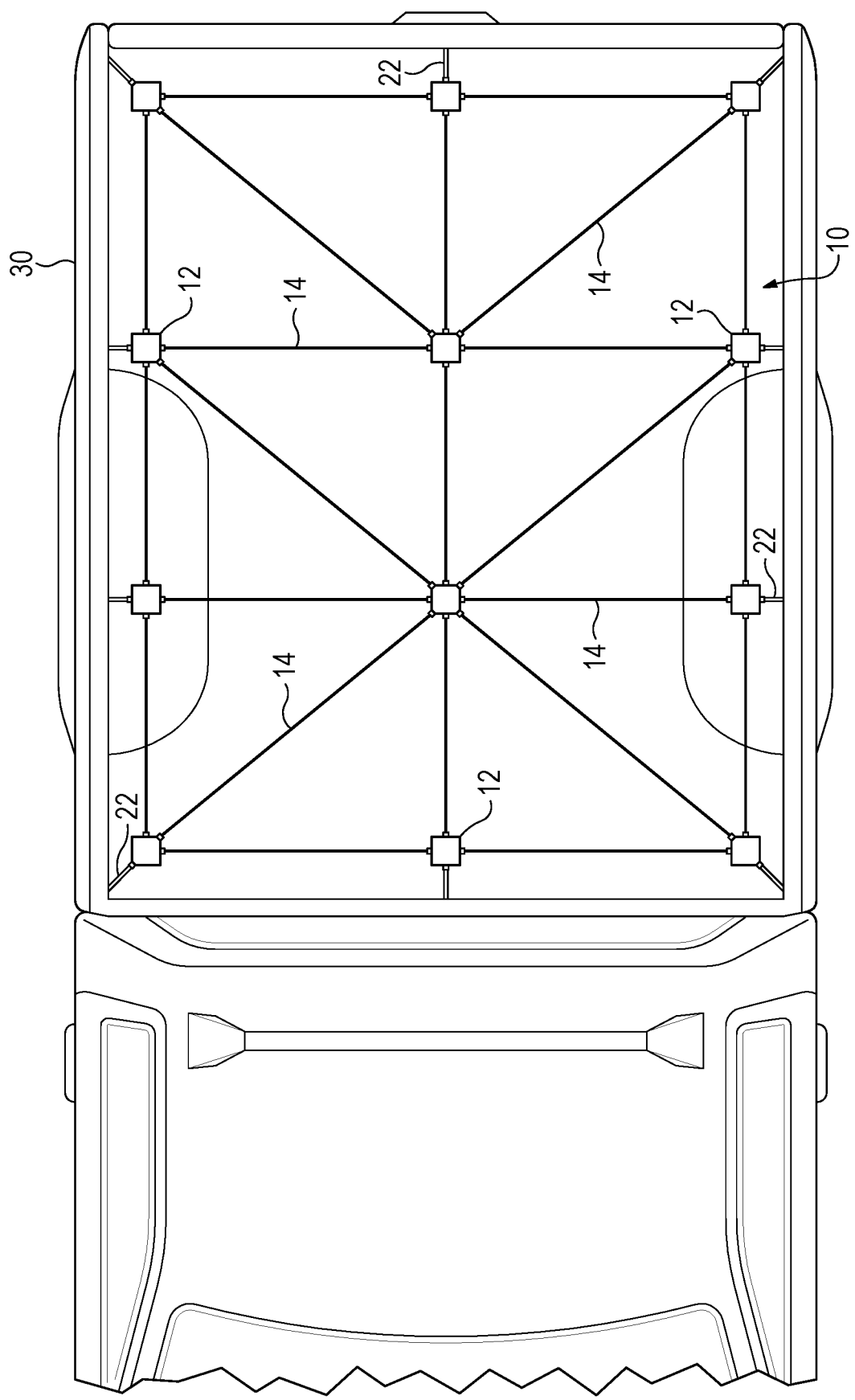
FIG. 3 is an isometric view of the cargo net of FIG. 1, deployed in position, covering the bed of a pickup truck.

FIG. 2 shows net 10 in an expanded form, with lines 14 drawn out from spring reel units 12. In one preferred embodiment, additional lines 24 extend between attachment points to lines 14, thereby yielding a denser expanded net 10. In one preferred embodiment, lines 24 are elastic, to limit droop when not in use, but in a separate preferred embodiment they are not. FIG. 3 shows net 10 expanded and over the bed of a pickup truck 30 by means of hooks 22.

Figure 4:
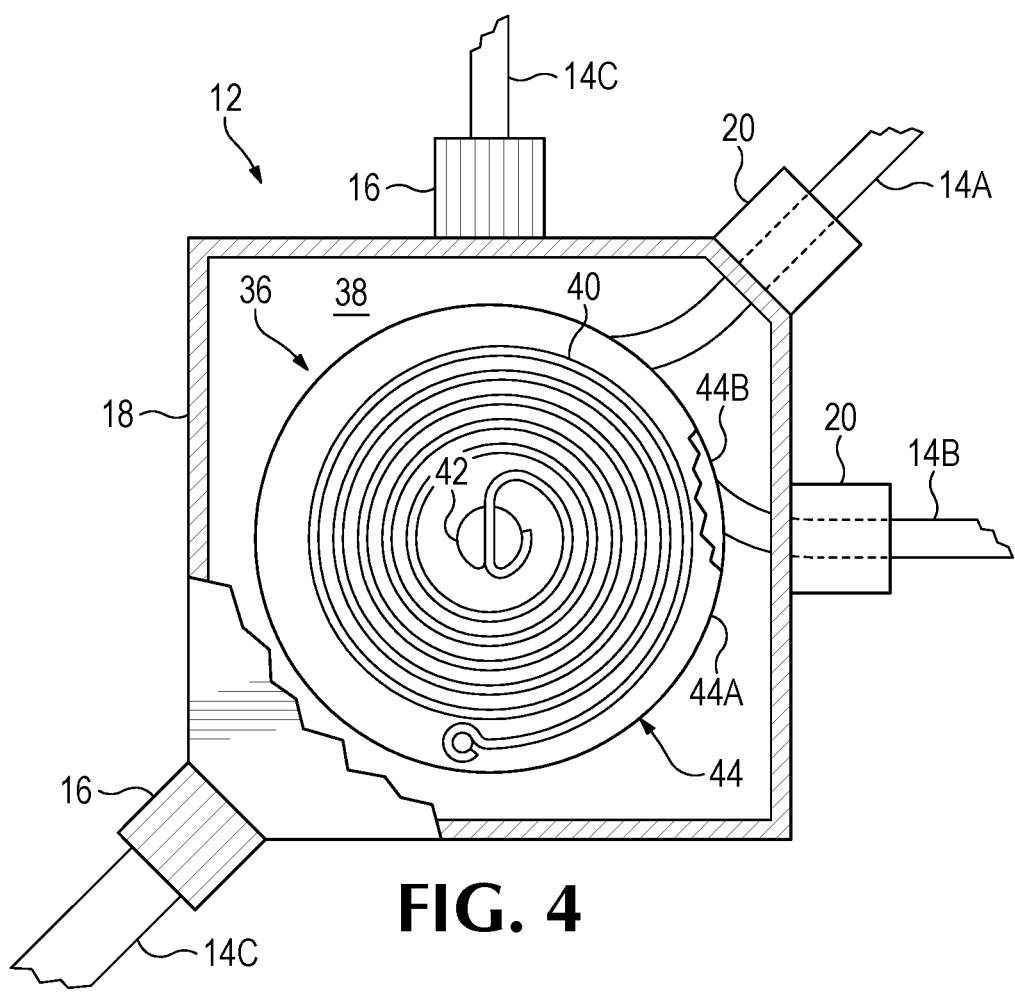
FIG. 4 is a cut-away plan view of a double spring reel, which forms a part of the cargo net of FIG. 1.

Referring now to FIG. 4, which is a cut-away plan view of a spring reel unit 12, two spring reels 36 are separated by an interior wall 38. Each unit 12 (except one) hosts two spools 44, the top-most spool referenced as 44A, and the bottom-most spool (from the perspective of FIG. 4) 44B. Each spring reel 36 includes a spiral spring 40, held in place at its inner end by an anchor 42, which is fixed to housing 18 and, at its outer end, attached to a spool 44. A line 14A (a specific one of lines 14) is wrapped about top-most spool 44A. The bottom spool, shown in the cut-away, is spool 44B, with line 14B wrapped about it. Spools 44A and 44B operate independently, in one preferred embodiment, thereby permitting net 10 to be expanded into any one of a number of generally rectangular shapes. An additional spiral spring 40 (not shown) is engaged to an anchor 42 (not shown) and spool 44B in the same manner as is shown and described for spool 44A. A pair of lines 14C, spooled at other units 12 are attached to housing 18 at anchor points 16.

Lines 14, more generally tension members, have physical characteristics chosen for the type of duty into which it is anticipated that net 10 will be placed. For covering the bed of a pickup truck, for example, lines 14 may be nylon cord having a thickness of between one sixteenth and one quarter of an inch, although many differing types of cord, rope or line can be used. In one embodiment, lines 14 are elastic, but in another embodiment they are inelastic. In one embodiment, units 12 are made of simply one or more housed spring reels 36 stacked and joined together in such a manner that each spring reel 36 can act independently. In another embodiment, however, spring reels 36 in a common housing 18 are twinned together in their action, thereby supporting enlargement to a specific shape, for example, a shape optimized to cover a standard pickup truck bed. Spring reels 36 are a commonly available item, offered for example from McMaster-Carr, which maintains a website at www.mcmaster.com. Another source of retractors is www.grainger.com.

The disclosed embodiments are illustrative, not restrictive. While specific configurations of the expandable net technology have been described, it is understood that the present invention can be applied to a wide variety of expandable nets. There are many alternative ways of implementing the invention.

What is claimed is:

1. An expandable net, comprising:
    a) a plurality of spring reels, each reel having:
        i. a housing defining an interior and having a central anchor, in said interior, and further defining an opening;
        ii. a spool rotatably mounted inside said housing, and having a side wall;
        iii. a tension member wound about said spool and extending through said opening and having a distal end; and
        iv. a spiral spring anchored at said anchor and having an outer end, attached to said side wall; and
    b) wherein said distal end of each tension member is attached to said housing of another spring reel of said plurality of reels, thereby forming said expandable net.

2. The expandable net of claim 1, wherein at least some of said housings contain multiple, independent spring reels, each independent reel having an attached tension member, having a distal end attached to another spring reel housing.

3. The expandable net of claim 2, wherein at least some of said housings contain two spring reels.

4. The expandable net of claim 1, further wherein attachment elements are attached to at least some of said spring reel housings.

5. The expandable net of claim 4, wherein said attachment elements are hooks.

6. The expandable net of claim 1, wherein said tension members are first tension members, and including second tension members, and wherein each one of said second tension members connects together two of said first tension members.

7. The expandable net of claim 6, wherein said second tension members are elastic.

8. A method of covering an open volume, partially enclosed by a rim, comprising:
    a) providing an expandable net having a perimeter, and including:
        i. a plurality of spring reels, each reel having a housing defining an interior and having a central anchor, in said interior, and further defining an opening; a spool rotatably mounted inside said housing, and having a side wall; a tension member wound about said spool and extending through said opening; a spiral spring anchored at said anchor and having an outer end, attached to said side wall; and
        ii. wherein a distal end of each tension member is attached to said housing of another said spring reel, thereby forming said expandable net; and
    b) expanding said expandable net and attaching said perimeter to said rim of said open volume.

9. The method of claim 8, wherein said expandable net includes hooks along said perimeter, and said perimeter is attached to said rim by said hooks.

10. The method of claim 8, wherein said open volume is a bed of a pickup truck.

11. The method of claim 8, wherein at least some of said housings contain multiple, independent spring reels, each independent reel having an attached tension member, having a distal end attached to another spring reel housing.

12. The method of claim 11, wherein at least some of said housings contain two spring reels.

13. The method of claim 8, wherein said tension members are first tension members, and including second tension members, and wherein each one of said second tension members connects together two of said first tension members.

14. The method of claim 13, wherein said second tension members are elastic.

* * * * *